United States Patent
Garden et al.

(10) Patent No.: US 10,503,225 B2
(45) Date of Patent: *Dec. 10, 2019

(54) NONHOMOGENEOUS SERVER ARRANGEMENT

(71) Applicant: MICROSOFT TECHNOLOGY LICENSING, LLC, Redmond, WA (US)

(72) Inventors: Euan Peter Garden, Bellevue, WA (US); John Raymond Justice, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/172,511

(22) Filed: Oct. 26, 2018

(65) Prior Publication Data

US 2019/0064895 A1     Feb. 28, 2019

Related U.S. Application Data

(63) Continuation of application No. 14/145,917, filed on Dec. 31, 2013, now Pat. No. 10,114,431.

(51) Int. Cl.
  *G06F 1/32*     (2019.01)
  *G06F 1/20*     (2006.01)
  (Continued)

(52) U.S. Cl.
  CPC ............ *G06F 1/206* (2013.01); *G06F 1/3206* (2013.01); *G06F 9/5094* (2013.01); *Y02D 10/16* (2018.01); *Y02D 10/22* (2018.01)

(58) Field of Classification Search
  CPC .................................................. G06F 9/5094
  See application file for complete search history.

(56) References Cited

U.S. PATENT DOCUMENTS

| | | |
|---|---|---|
| 6,985,952 B2 | 1/2006 | Bohrer et al. |
| 2007/0245165 A1 | 10/2007 | Fung |

(Continued)

FOREIGN PATENT DOCUMENTS

| | | |
|---|---|---|
| JP | H05241694 A | 9/1993 |
| RU | 2316809 C2 | 2/2008 |

(Continued)

OTHER PUBLICATIONS

"Enhance Data Center Utilization by 95%with Enterprise Scale Workload Management,", In White Paper of Oracle, Apr. 13, 2011, 4 Pages.

(Continued)

*Primary Examiner* — Mohammad Ali
*Assistant Examiner* — Vincent W Chang
(74) *Attorney, Agent, or Firm* — Shook, Hardy & Bacon LLP (57) ABSTRACT

Aspects of the present invention describe a nonhomogeneous server deployment in which different classes of servers are placed within a data center unit, such as a rack or chassis. In one aspect, the cooling capacity for the unit is intentionally sized to be incapable of providing enough cooling to maintain an acceptable operational temperature for the servers, if all servers in the rack are simultaneously in an active processing mode. The control fabric maintains an acceptable operating temperature within the unit by assigning workloads to only a portion of the servers within the unit at a given point in time. In one aspect, servers are arranged within a data center unit according to anticipated peak periods of usage. Units can be arranged to be adjacent to servers optimized for a specialized workload having a peak period of usage that differs from each other.

20 Claims, 7 Drawing Sheets

(51) Int. Cl.
*G06F 9/50* (2006.01)
*G06F 1/3206* (2019.01)

(56) References Cited

U.S. PATENT DOCUMENTS

| | | | |
|---|---|---|---|
| 2010/0010688 A1* | 1/2010 | Hunter | G06F 1/206 700/300 |
| 2011/0107220 A1 | 5/2011 | Perlman | |
| 2012/0004039 A1 | 1/2012 | Perry et al. | |
| 2012/0283892 A1* | 11/2012 | Humphrey | G06F 1/28 700/297 |
| 2013/0254428 A1* | 9/2013 | Kodama | G06F 15/161 709/250 |
| 2014/0126149 A1* | 5/2014 | Campbell | H05K 7/2079 361/699 |
| 2014/0286438 A1* | 9/2014 | Apte | H04N 21/2343 375/240.26 |
| 2014/0309039 A1 | 10/2014 | Yoshida et al. | |
| 2015/0036280 A1* | 2/2015 | Gektin | H05K 7/1452 361/679.32 |

FOREIGN PATENT DOCUMENTS

| | | |
|---|---|---|
| RU | 2488878 C2 | 7/2013 |
| WO | 2013090379 A1 | 6/2013 |
| WO | 2013119226 A1 | 8/2013 |

OTHER PUBLICATIONS

"Final Office Action Issued in U.S. Appl. No. 14/145,915", dated Jan. 25, 2018, 24 Pages.

"Final Office Action Issued in U.S. Appl. No. 14/318,867", dated Oct. 18, 2016, Oct. 18, 2016, 9 Pages.

"Office Action Issued in Colombian Patent Application No. 16170520", dated Jan. 17, 2018, 10 Pages.

"Office Action Issued in Colombian Patent Application No. 16170520", dated Sep. 1, 2016, 7 Pages. (W/O English Translation).

"Office Action Issued in Chilean Patent Application No. 1633-2016", dated Jun. 24, 2016, 5 Pages. (W/O English Translation).

"Office Action Issued in Chilean Patent Application No. 1633-2016", dated May 18, 2018, 6 Pages.

"First Office Action Issued in Chinese Patent Application No. 201480071809.1", dated Oct. 23, 2018, 15 Pages.

"Office Action Issued in Russian Patent Application No. 2016125868", dated Aug. 29, 2018, 9 Pages. (W/O English Translation).

"Office Action Issued in Japan Patent Application No. 2016-544085", dated Nov. 28, 2018, 9 pages.

"Office Action Issued in Israel Patent Application No. 245729", dated Mar. 28, 2018, 7 Pages.

Douglas, Hunt, "Gaming Moves to the Cloud", Retrieved from http://insight.nokia.com/gaming-moves-cloud, Apr. 7, 2011, 3 pages.

Feng, et al., "Bargaining Towards Maximized Resource Utilization in Video Streaming Datacenters", In the 31st Annual IEEE International Conference on Computer Communications, Mar. 25, 2012, 9 Pages.

"Office Action Issued in Mexican Patent Application No. MX/a/2016/008604", dated Jan. 29, 2018, 4 Pages.

"Office Action Issued in Mexican Patent Application No. MX/a/2016/008604", dated Jul. 27, 2018, 7 Pages.

"International Preliminary Report on Patentability Issued in PCT Application No. PCT/US2015/038206", dated Sep. 16, 2016, 9 Pages.

"International Search Report & Written Opinion Received for PCT Application No. PCT/US2015/038206", dated Oct. 8, 2015, Oct. 8, 2015, 11 Pages.

Teich, Paul, "Future of Data Center Processors: No Wimpy Cores?", Retrieved from: https://insights.dice.com/2012/09/27/future-of-data-center-processors-no-wimpy-cores/, Sep. 27, 2012, 11 Pages.

* cited by examiner

NONHOMOGENEOUS SERVER ARRANGEMENT

CROSS-REFERENCE TO RELATED DOCUMENTS

This application is a continuation of U.S. patent application Ser. No. 14/145,917, filed on Dec. 31, 2013, titled "Nonhomogeneous Server Arrangement" the entirety of which is hereby incorporated by reference.

BACKGROUND

Servers within a data center are typically deployed in a homogeneous arrangement, especially within a data center rack. If not exactly the same model server, a homogeneous arrangement of servers will comprise servers with similar specifications. The homogeneous approach can provide efficiency for upfront capital expenditures as well as maintenance cost. Generally, the servers selected for deployment in a homogeneous arrangement can perform a wide range of computing tasks, but may not perform some computing tasks very efficiently.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the present invention describe a nonhomogeneous server deployment in which different classes of servers are placed within a data center unit, such as a rack or chassis. In one aspect, the cooling capacity for the unit is intentionally sized to be incapable of providing enough cooling to maintain an acceptable operational temperature for the servers, if all servers in the rack are simultaneously in an active processing mode. The control fabric maintains an acceptable operating temperature within the unit by assigning workloads to only a portion of the servers within the unit at a given point in time. For example, at any given time only a portion of the servers may be assigned a workload and be in an active processing state. The remaining servers in a rack are set to a low-power state to balance the heat load generated within the rack with the rack's available cooling.

In one aspect, servers within the unit all have a similar maximum power usage when in active processing mode. In one aspect, servers are arranged within a data center unit according to anticipated peak periods of usage. Units are arranged to be adjacent to servers optimized for a specialized workload having a peak period of usage that differs from each other. For example, a first class of server associated with a specialized workload with peak hours from 4 PM to 12 PM can be matched with a second class of server having a specialized workload with peak hours from 6 AM to 2 PM. In other words, during a given period, either a first class or a second class of server within a rack will be in a high demand.

BRIEF DESCRIPTION OF THE DRAWINGS

Aspects of the invention are described in detail below with reference to the attached drawing figures, wherein.

DETAILED DESCRIPTION

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention describe a nonhomogeneous server deployment in which different classes of servers are placed within a data center unit, such as a rack or chassis. In one aspect, the cooling capacity for the unit is intentionally sized to be incapable of providing enough cooling to maintain an acceptable operational temperature for the servers, if all servers in the rack are simultaneously in an active processing mode. The control fabric maintains an acceptable operating temperature within the unit by assigning workloads to only a portion of the servers within the unit at a given point in time. For example, at any given time only a portion of the servers may be assigned a workload and be in an active processing state. The remaining servers are set to a low-power state to balance the heat load at a point the cooling system is capable of handling.

In one aspect, different types of servers are deployed in a data center unit (e.g., rack, chassis) to maximize use of available cooling throughout a time period by mixing server types to allow the serving of multiple workloads, each of which has unique usage and load patterns over time. Generally, when one type of server is in an active pattern the other types will be in an inactive usage pattern, but usage patterns can overlap.

In one aspect, servers within the unit all have a similar power usage when in active processing mode. For example, gaming optimized servers having a power usage of 150 W capacity can be deployed in the same rack with enterprise servers having a 150 W usage. Alternatively, a first type of server having a 300 W active usage could be deployed in the same rack with twice the number of 150 W servers of a second type. Other combinations are possible. The goal is to provide a mixture of server types that can be active at different times to efficiently use the available cooling and power supply to the data center unit.

Even though the total power usage of two different types of servers in a rack can be similar, the distribution of power usage within the server can differ greatly. For example, the gaming optimized server may have a graphics processing unit ("GPU") that uses 100 W and a central processing unit ("CPU") that uses 50 W. The enterprise server may not have a GPU, but could have a more powerful CPU that consumes 150 W. A control fabric within the data center assigns computing loads to either the gaming optimized servers in a rack or the enterprise servers within the rack in a way that ensures less than a threshold of total servers are active at any given time.

In one aspect, servers are arranged within a data center unit according to anticipated periods of active usage, especially peak usage. The usage periods do not need to be entirely exclusive. The goal can be to match server types that are specialized to handle workloads with different anticipated usage periods so one or more type of server in a rack can be in a lower power mode while another type is in active processing mode. For example, a first class of server associated with a specialized workload with peak hours from 4 PM to 12 PM can be matched with a second class of server having a specialized workload with peak hours from 6 AM to 2 PM. In other words, during a given period either a first class or a second class of server within a rack will be in a high demand.

Aspects of the present invention are not limited to servers designed for specialized workloads. For example, a gaming optimized server could be arranged adjacent to a general purpose server. During peak gaming hours, the most of the gaming optimized servers would be in active mode and most of the general purpose servers would be in a low-power mode. During off-peak gaming hours, the general-purpose servers within the rack can transition to an active mode while a majority of the gaming optimized servers transition to a low-power mode.

As used herein, a "gaming optimized server" is adapted to output a rendered video game image to a client device, such as a game console. The video game image may be rendered as a streaming video communicated to the client. In order to render a high quality video game image, a gaming optimized server can have a graphics processing unit that is more powerful than a graphics processing unit, if any, found in a general-purpose server. The gaming optimized server may also have video encoding capabilities.

Power consumption can be used as a proxy for a processor's capabilities. In one aspect, a gaming optimized server can be defined by the inclusion of a GPU that consumes greater than a threshold percentage of power used by the gaming optimized server during peak power consumption. In one aspect, the threshold percentage of power is greater than 40%, for example greater than 50%, for example greater than 60%, for example greater than 70%, or for example greater than 80%. For example, a GPU in a gaming optimized server could use 100 W, with a total peak power usage (e.g., GPU and CPU) of 150 W in the gaming optimized server.

As used herein, the terms "general purpose server" or "general processing optimized server" describes a server designed to emphasize computing process typically associated with a central processing unit. General-purpose servers can be capable of performing specialized computing processes, but may not be optimized for that purpose. For example, a CPU can perform graphics processing less efficiently than the same or similar tasks that can be performed by a GPU.

Aspects of the present invention may transition various classes of servers between different power modes or states. As used herein, the term "low-power mode" means a device is presently operating at less than 20% of the server's maximum rate of power. As an example, a server in low-power mode may be shut off, but able to respond to a power-on command. In another example, a server in low-power mode is in standby or idle mode and ready to receive a task, but not currently processing a computing workload.

As used herein, the phrase "active processing mode" means a server is actively processing a computing workload. A server in active processing mode can be using greater than 20% of the server's maximum rate of power.

Having briefly described an overview of aspects of the invention, an exemplary operating environment suitable for use in implementing aspects of the invention is described below.

Exemplary Operating Environment

Figure 1:
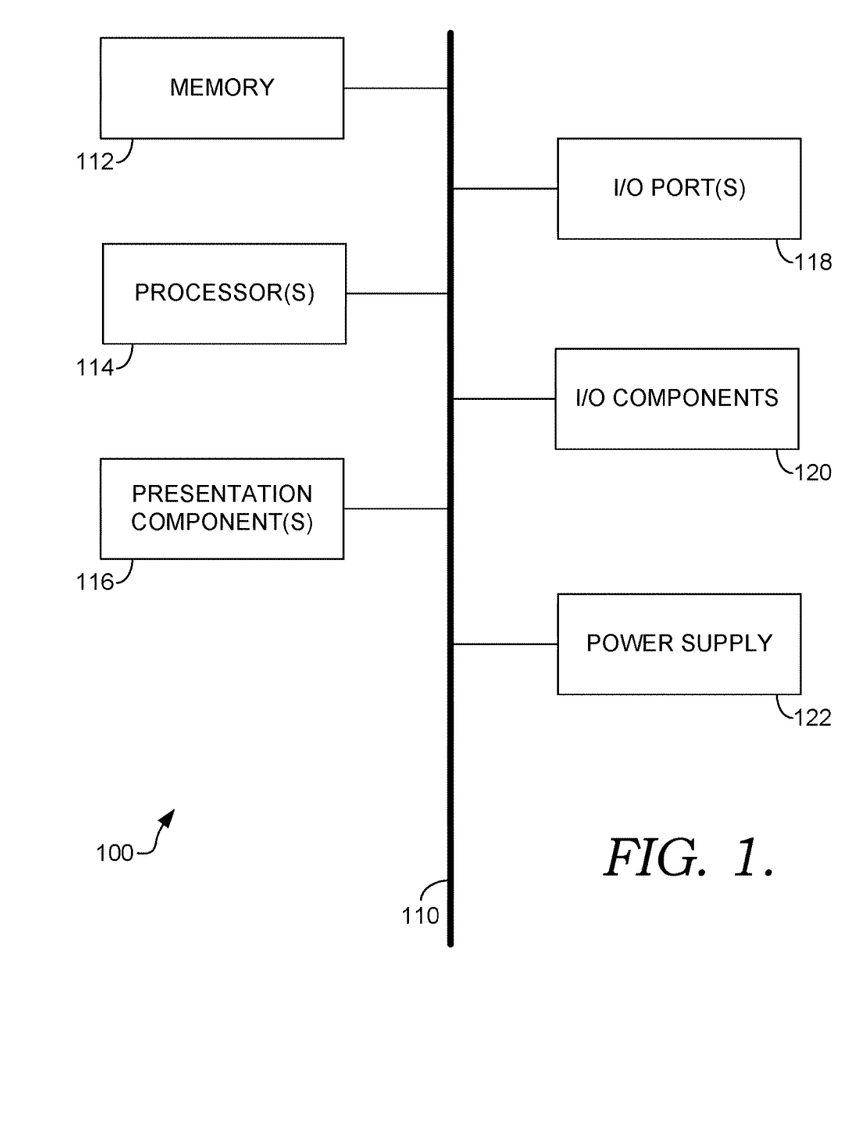
FIG. 1 is a block diagram of an exemplary computing environment suitable for implementing aspects of the invention.

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG.

1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
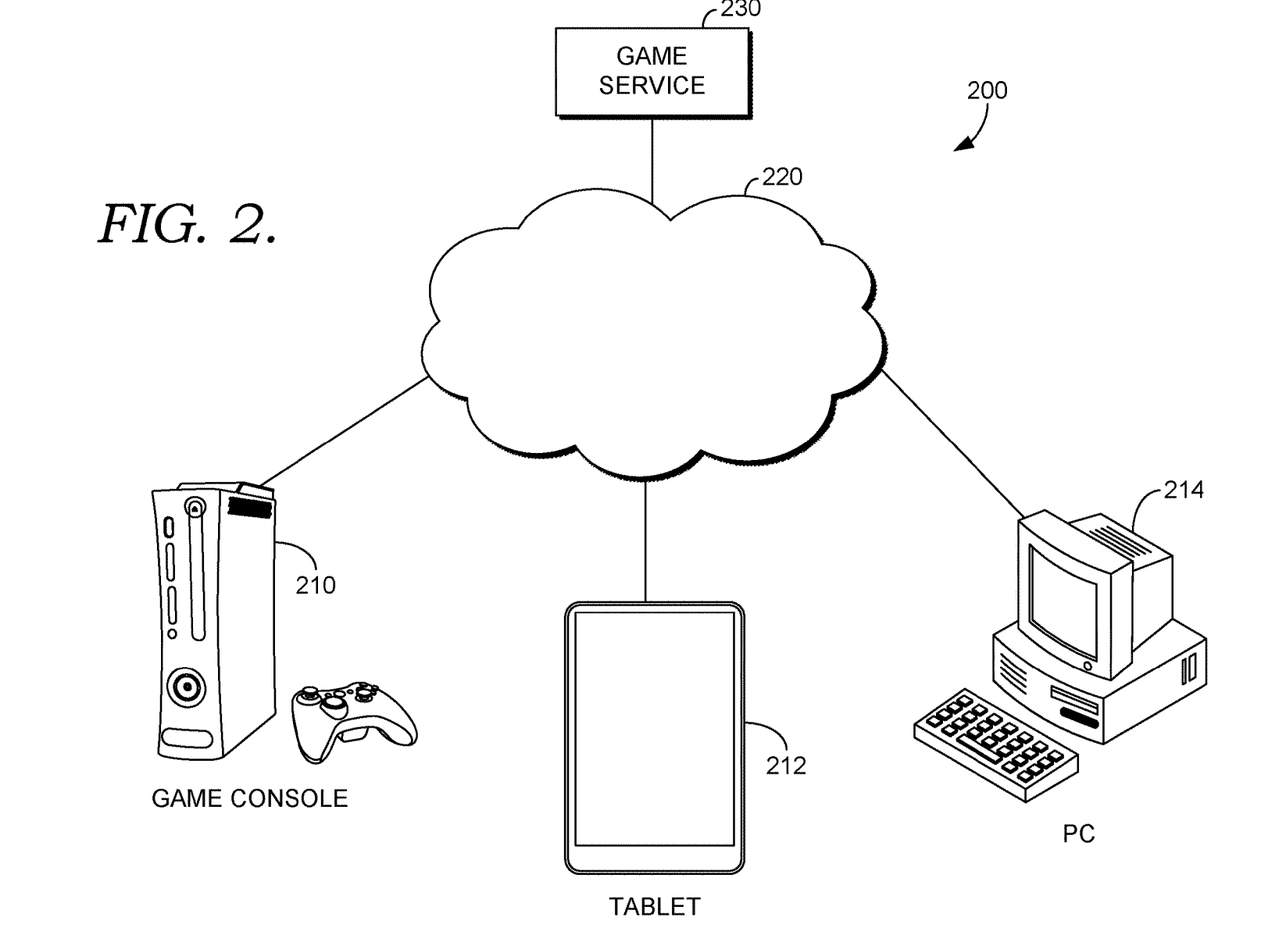
FIG. 2 is a diagram depicting a gaming environment, in accordance with an aspect of the present invention.

Turning now to FIG. 2, an online gaming environment 200 in which a nonhomogeneous arrangement of servers may be deployed within a data center is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

Game service 230 comprises multiple computing devices communicatively coupled to each other. In one embodiment, the game service 230 is implemented using one or more data centers. The data centers may be spread out across various geographic regions including cities throughout the world. In this scenario, the game clients may connect to the closest data centers. Embodiments of the present invention are not limited to this setup.

The game service 230 allows the game to be executed within the computing devices provided by the game service 230. A communication session between the game service and game clients carries input traffic to the game service 230 and returns a rendered game image. In this embodiment, a computing device that is part of the game service executes the video game code using a control stream generated by input devices associated with the various game clients. The rendered video game is then communicated over the network to the game client where the rendered game is output for display.

The game service 230 may be provided by a data center that uses a combination of gaming optimized servers to execute the game and rendered video game image. The gaming optimized servers may be deployed with non-gaming optimized servers. When a suitable task is not available for the gaming optimized servers, the gaming optimized servers can be placed in a low-power mode and the non-gaming optimized servers activated.

Exemplary Game Service

Figure 3:
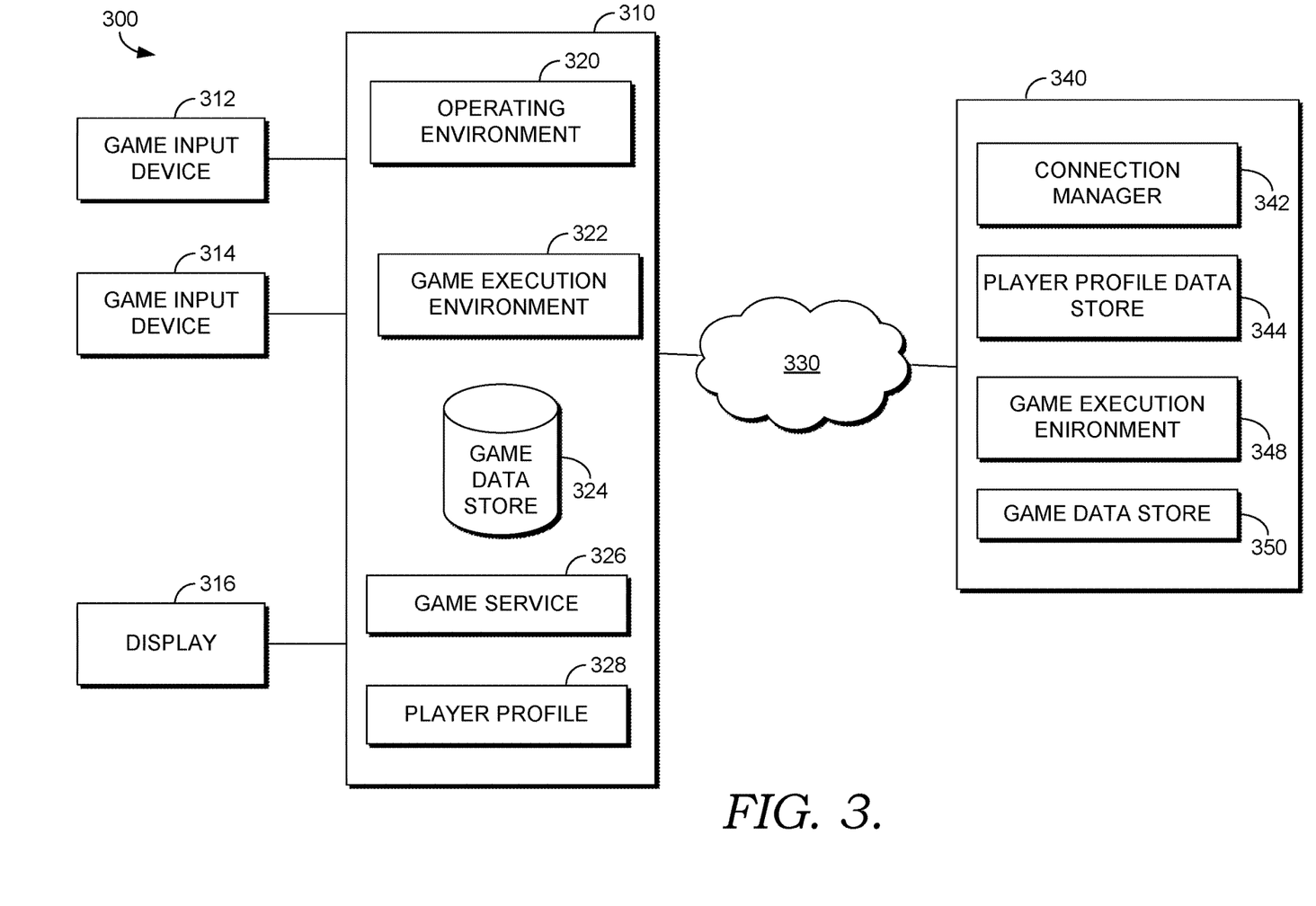
FIG. 3 is a diagram depicting a remote gaming environment having one or more data centers with an nonhomogeneous arrangement of gaming servers and general purpose servers, in accordance with an aspect of the present invention.

Turning now to FIG. 3, an exemplary remote gaming environment 300 is shown, in accordance with an embodiment of the present invention. The gaming environment 300 includes a game client 310 that is shown communicatively coupled to a game service 340 through a network 330. In one embodiment, the network may be the Internet. The game client 310 is connected to a first game input device 312, a second game input device 314, and a display 316. Exemplary game input devices include game pads, keyboards, a mouse, a touch pad, a touch screen, a microphone for receiving voice commands, a depth camera, a video camera, a keyboard, and a trackball. Embodiments of the present invention are not limited to these input devices. The display device 316 is capable of displaying video game content. For example, the display 316 may be a television or computer screen. In another embodiment, the display 316 is a touch screen integrated with the game client 310.

The game client 310 is a computing device that is able to execute video games. The game client 310 could be a tablet or a laptop computer. In another embodiment, the game client 310 is a game console and the display 316 is a remote display communicatively coupled to the game console. The game client 310 includes an operating environment 320, a game execution environment 322, a game data store 324, a game service client 326, and a player profile data store 328.

The operating environment 320 may be provided by an operating system that manages the hardware and provides services to application running on the game client 310. The operating environment may allocate client resources to different applications as part of the game migration. For example, the operating environment may give control of the display to the game execution environment 322 once game play is migrated to the game client 310.

The game execution environment 322 comprises the gaming resources on the client 310 required to execute instances of a game or a game preview. The game execution environment 322 comprises active memory along with computing and video processing. The game execution environment 322 receives gaming controls and causes the game to be manipulated and progressed according to its programming. In one embodiment, the game execution environment 322 outputs a rendered video stream that is communicated to the display 316.

The game data store 324 stores downloaded games, game previews, and partially downloaded games.

The game service client 326 is a client application that displays rendered video game images received from the game service 340. The game service client 326 may also process game input and change it into an easily uploadable format that is communicated to the game service 340. The game service client 326 may also scale the rendered video game images received from the service 340 to a size optimized for display 316.

The player profile data store 328 stores player profile information for individual games. The player profile information may also save tombstones or game-saved data for individual games, including previews. Both the game-save file and the tombstone record game progress. The game execution environment 322 then reads the game-saved data to start the game where the player left off on the server. The opposite scenario is also possible where the game-saved data and player profile information is uploaded from the game client 310 to the game service 340 to initiate the game.

The game service 340 comprises a connection manager 342, a player profile data store 344, a game execution environment 348, and a game data store 350. Though depicted as a single box, the game service 340 could be implemented in a data center that comprises numerous machines, or even several data centers.

The connection manager 342 builds a connection between the client 310 and the service 340. The connection manager 342 may also provide various authentication mechanisms to make sure that the user is authorized to access the game service 340. The connection manager 342 may also analyze the bandwidth available within a connection and throttle the download of a game during game play to make sure that game play is not degraded.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. As a player progresses through a game or game preview, the player's score and access to game levels may be stored. Further, the player profile data store 344 may store information about individual player preferences such as language preferences. Information regarding a player's game client and speed of the network connection may also be stored and utilized to optimize the gaming experience. For example, in one embodiment, when a geographically proximate data center is busy, players with higher latency Internet connections may be preferentially connected to proximate data centers while players with lower latency connections may be connected to data centers that are further away. In this way, the players with the network connections that are best able to handle the additional latency are connected to data centers that create additional latency because of their location.

The player profile data store 344 may also store a usage history for the individual player. A player's history of purchasing games, sampling games, or playing games through a game service that does not require the purchase of the games may be stored. The usage information may be analyzed to suggest games of interest to an individual player. In one embodiment, the purchase history may include games that are not purchased through the game service. For example, the purchase history may be augmented by the player entering in a key from a game purchased in a retail store. In some embodiments, the player may then have access to that game both on their game client 310 and through the game service when they are no longer at their game client.

The game execution environment 348 comprises the gaming resources required to execute instances of a game. These are the resources described previously that are managed by the game manager 352 and other components. The game execution environment 348 comprises active memory along with computing and video processing. The game execution environment 348 receives gaming controls through an I/O channel and causes the game to be manipulated and progressed according to its programming. In one embodiment, the game execution environment 348 outputs a rendered video stream that is communicated to the game client. In other embodiments, the game execution environment 348 outputs game geometry, or other representations, which may be combined with local objects on the gaming client to render the gaming video.

The game data store 350 stores available games. The games may be retrieved from the data store and activated through an active memory. The game data store 350 may be described as passive or secondary memory. In general, games may not be played off of the game data store 350. However, in some embodiments, the secondary memory may be utilized as virtual memory, in which case portions of the game data store 350 may also serve as active memory. This illustrates that active memory is not necessarily defined by a particular hardware component, but is defined by the ability of the game resources to actively manipulate and access objects within the memory to execute the game.

Figure 4:
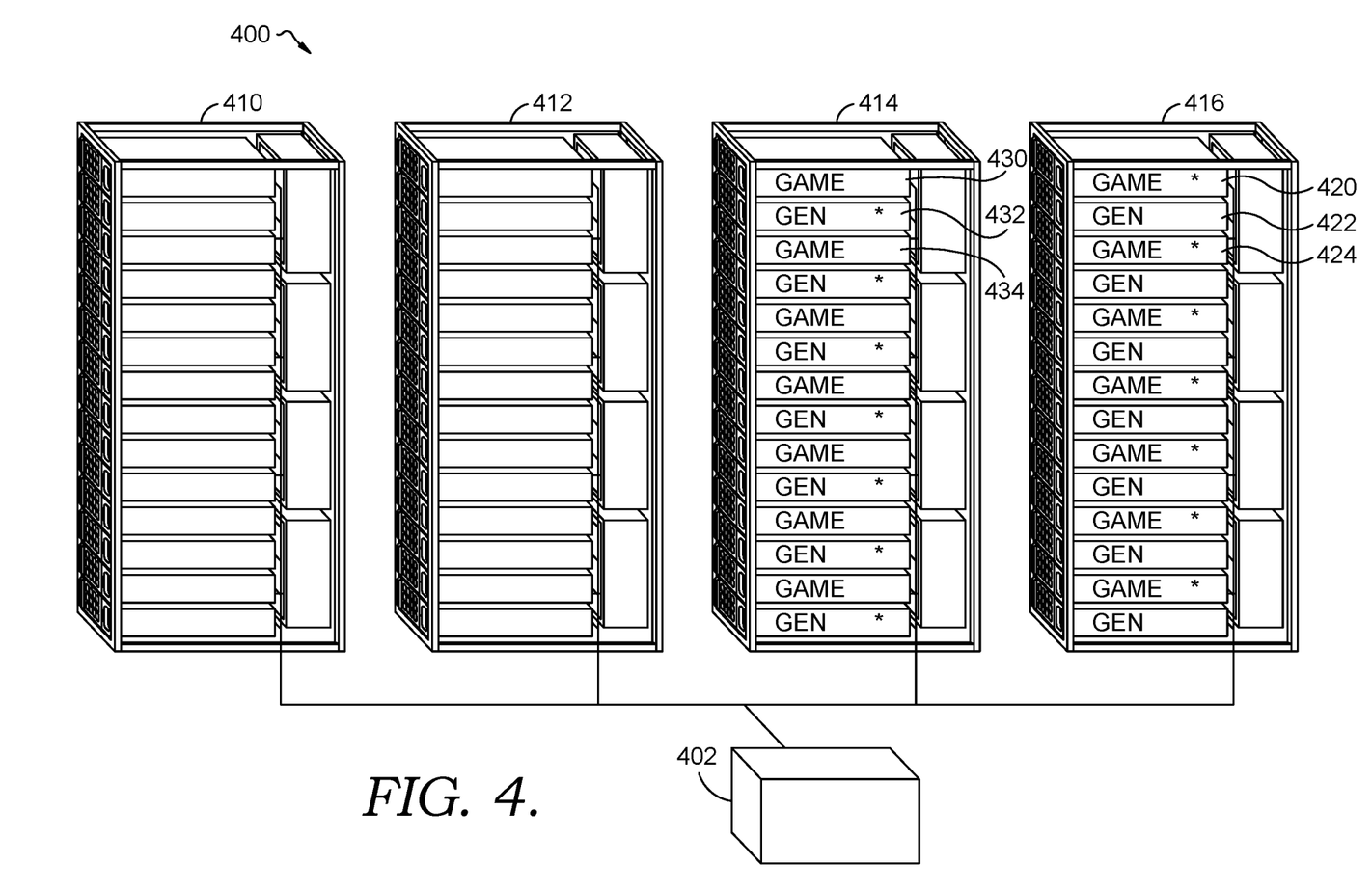
FIG. 4 is a diagram depicting an interleaved arrangement of gaming servers and general purpose servers, in accordance with an aspect of the present invention.

Turning now to FIG. 4, a nonhomogeneous arrangement of servers within a data center 400 is shown, in accordance with an aspect of the present invention. The arrangement comprises rack 410, rack 412, rack 414, and rack 416. Four racks are shown for the sake of simplicity; an actual implementation could include tens, hundreds, or thousands of racks deployed within a data center. Each rack can comprise a quantity of servers, power distribution equipment, and networking equipment. In one arrangement, a networking cable is run to a router/switch within the rack. Each server in the rack then connects to the router. Similarly, power may be run to a power distribution station associated with the rack. Each server is then coupled to the power distribution station.

Additionally, each rack can include cooling equipment, such as fans. In one arrangement, a fan wall is provided behind the servers to draw air through the servers. In a vertical cooling arrangement, one or more fans are located above or below the rack to facilitate airflow to the servers within the rack. The cooling equipment can also include thermocouples and other sensors that measure temperature, pressure, and air flow throughout the rack. The rack may include one or more fixed or adjustable baffles to distribute air where needed for cooling.

A control fabric 402 is communicatively coupled to the racks and computing devices within the racks. The control fabric 402 manages the state of each server. For example, the control fabric 402 can transition a server between an active processing mode and a low power mode. The control fabric 402 can distribute workloads to computing devices. The control fabric 402 can also manage cooling equipment within the racks. For example, the control fabric 402 can lower fan speed within a rack when the servers within the rack are in a low power mode.

The control fabric 402 manages a cooling budget and a power budget for a rack. Racks within the data center can have a limited cooling capacity and a limited power supply. Specifically, the cooling available at a rack can be significantly less than adequate to cool the servers in the rack, if all the servers were in an active processing mode. The control fabric 402 can distribute workloads to make sure heat produced by servers within a rack does not exceed cooling available for the rack. Similarly, the control fabric 402 can distribute workloads to make sure the power supply to the rack is not overused.

Racks 414 and 416 illustrate nonhomogeneous servers in an interleaved arrangement. The interleaved arrangement alternates a gaming optimized server with a general purpose server. Aspects of the present invention are not limited to alternating servers, and other interleaved arrangements are possible. In one aspect not shown, each chassis within a rack has a homogeneous arrangement, but the rack includes chassis having different classes of servers. In other words, the interleaving may be chassis-by-chassis within a rack. In one aspect, the total rated power consumption of a first class of server within a rack matches the total rated power consumption of a second class of server within the rack.

Illustratively, rack 416 includes game optimized server 420, general-purpose server 422 and game optimized server 424. The "*" indicates that game optimized server 420 and game optimized server 424 are active. In rack 416, all of the game optimized servers are active and all of the general purpose servers are in a low power mode.

Illustratively, rack 414 includes game optimized server 430, general-purpose server 432 and game optimized server 434. The "*" indicates that general-purpose server 432 is active. In rack 414, all of the game optimized servers are in a low power mode and all of the general-purpose servers are in an active processing state.

In combination with rack 416, this illustrates that racks can be transitioned between a gaming optimization and general-purpose optimization by activating different servers within the rack. In one aspect, the general-purpose servers and game optimized servers have peak usage periods that do not significantly overlap. Racks with an arrangement of nonhomogeneous servers, such as racks 414 and 416, may be deployed within a data center in combination with homogeneous racks. The quantity of homogeneous racks may be specified to accommodate base demand for the computing service provided by an optimized server. The deployment of racks to meet base demand allows the homogeneous racks to be active above a threshold amount of time on average. For example, an amount of homogeneous racks deployed may be limited to those able to be active on average 80% of a day. Optimized servers in the nonhomogeneous racks can be used during peak usage periods to accommodate demand in combination with optimized servers in the homogeneous racks.

Figure 5:
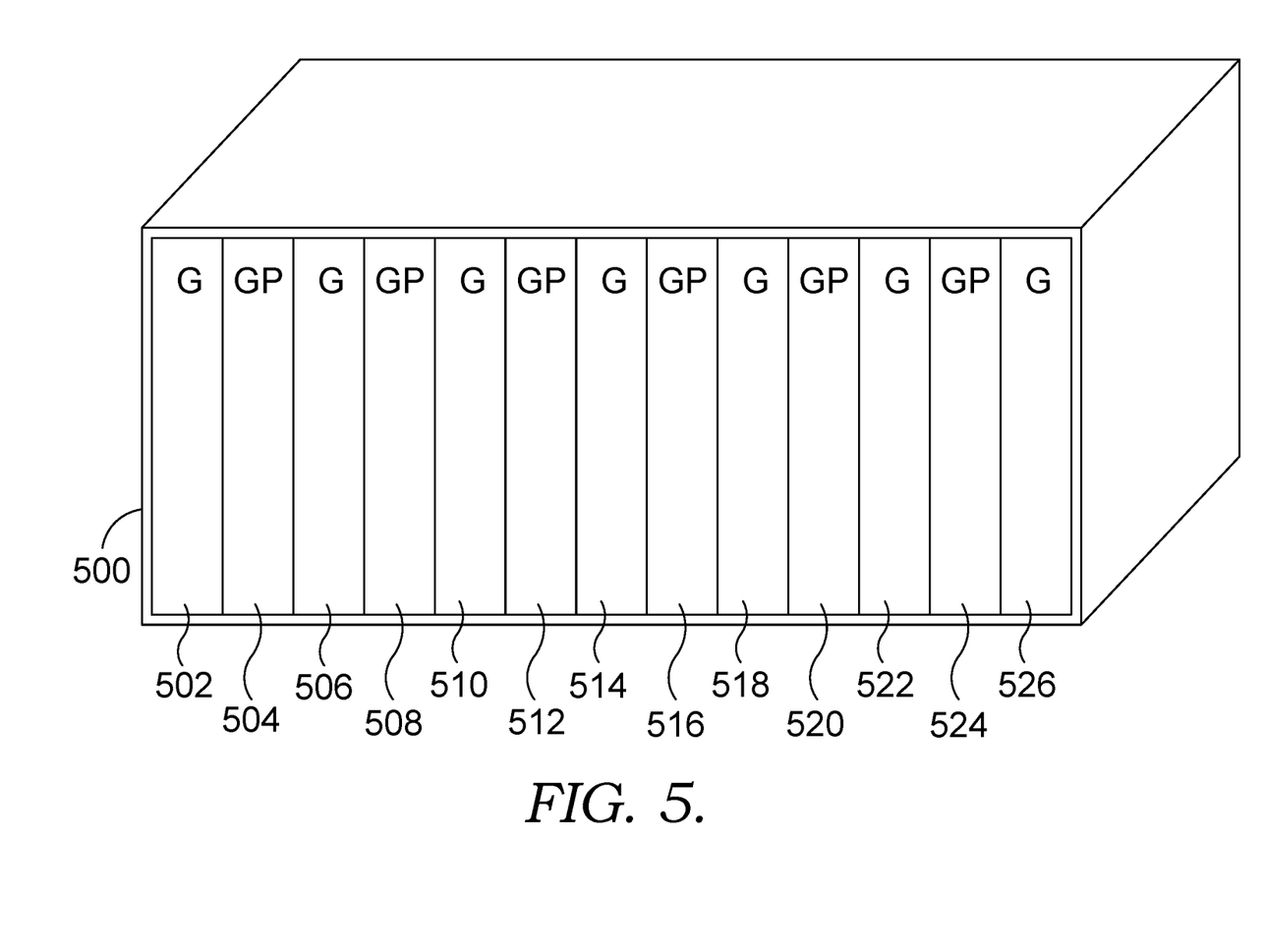
FIG. 5 is a diagram depicting an interleaved arrangement of gaming servers and general purpose servers within a chassis, in accordance with an aspect of the present invention.

Turning now to FIG. 5, an arrangement of nonhomogeneous servers within a chassis 500 is shown, in accordance with an aspect of the present invention. Again, gaming and general-purpose servers are shown for the sake of illustration. Aspects of the present invention are not limited to gaming and general-purpose servers. Further, aspects of the present invention are not limited to using only two different types or classes of servers within an arrangement.

Aspects of the present invention describe arrangements of nonhomogeneous servers within a data center unit. A rack, which has been described previously with reference to FIG. 4, is one example of a data center unit. The chassis is another example of a suitable data center unit for an arrangement of nonhomogeneous servers. A single rack may include multiple chassis. In one aspect, a single chassis within a rack may have an arrangement of nonhomogeneous servers while other chassis in the rack have homogeneous servers.

The chassis includes gaming server 502, general-purpose server 504, gaming server 506, general-purpose server 508, gaming server 510, general-purpose server 512, gaming server 514, general-purpose server 516, gaming server 518, general-purpose server 520, gaming server 522, general-purpose server 524, and gaming server 526. As can be seen, gaming servers alternate every other one with general-purpose servers. This is one example of an interleaved arrangement. Other arrangements are possible.

As described previously, the general-purpose servers and gaming servers may have a similar or identical peak power usage. In any given time period, approximately half of the servers can be in low power mode and half in active processing mode. The cooling provided to the chassis can be inadequate to cool the total quantity of servers in chassis 500 when all of the servers are running in active processing mode. In one aspect, about 60% of the cooling required to run all of the total quantity of servers in active processing mode is provided.

Figure 6:
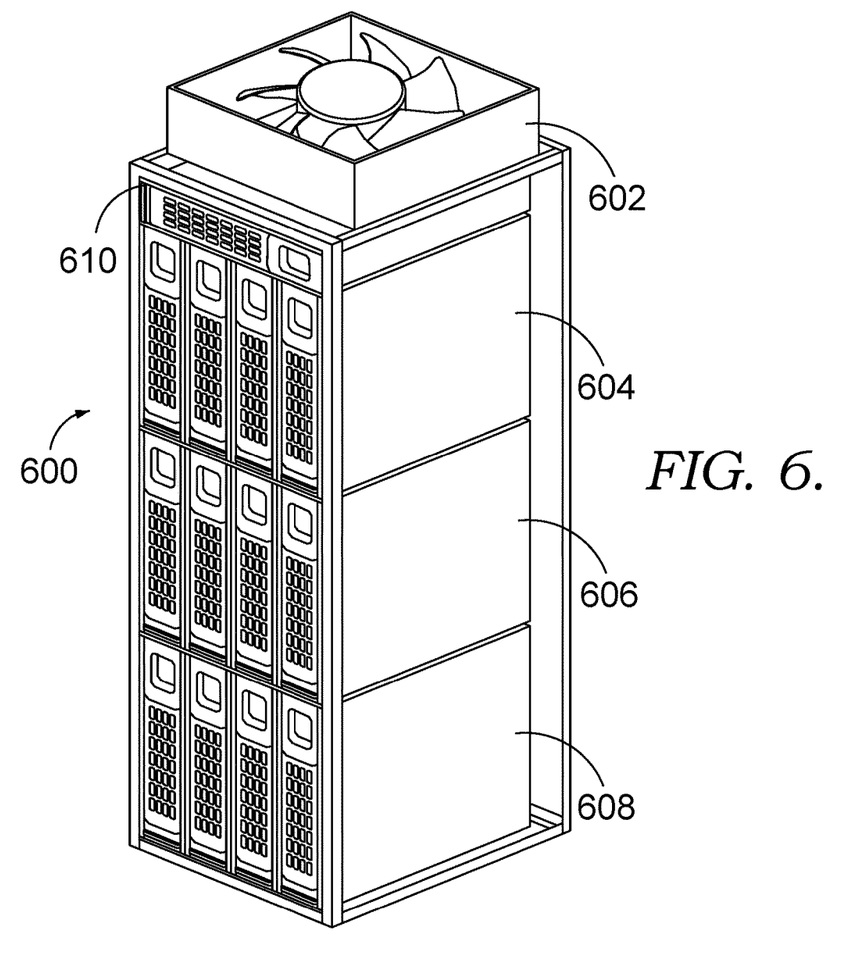
FIG. 6 is a diagram depicting a data center rack with vertical cooling, in accordance with an aspect of the present invention.

A vertical column cooling arrangement is shown in FIG. 6. In one aspect, cooling is provided to a rack 600 using a vertical column arrangement. Vertical cooling uses one or more large fans on top or beneath the rack to cool the servers within the rack. Baffles may be provided through the devices and through the rack to direct cooling as needed.

The rack 600 includes chassis 604, chassis 606, and chassis 608. Each chassis includes four servers oriented vertically. The servers can be connected to network component 610 located at the top of the rack. Fan 602 draws cool air through the servers to provide cooling. The servers in rack 600 may comprise at least two different classes of servers. In one aspect, fan 602 provides enough cooling for half of the servers to be running in an active processing mode.

Figure 7:
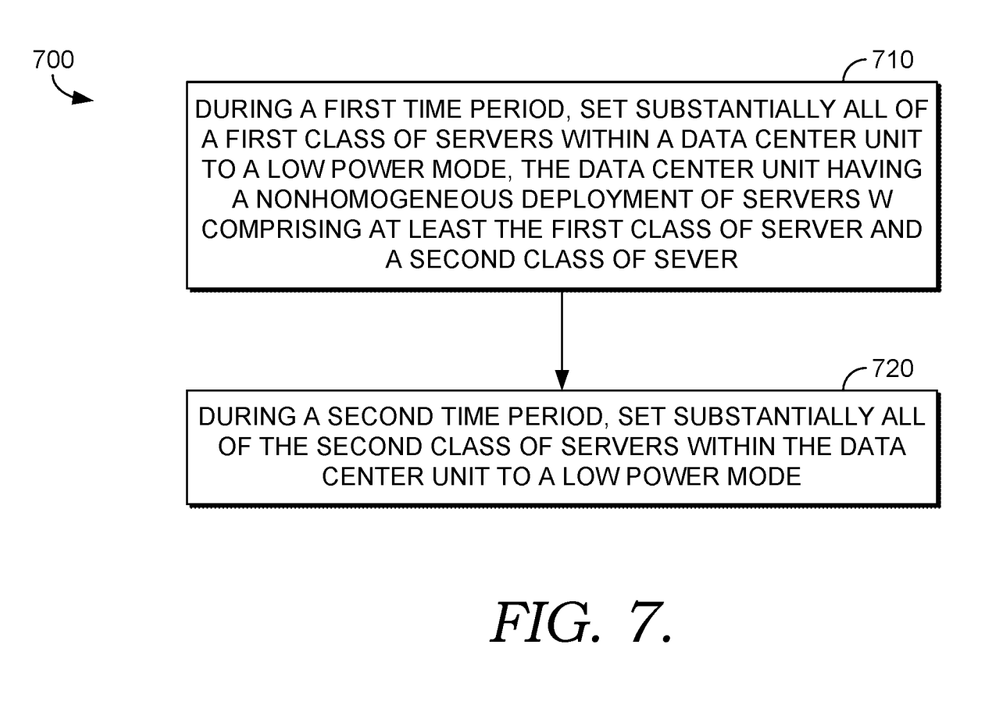
FIG. 7 is a diagram depicting a method for managing workloads within a data center, in accordance with an aspect of the present invention.

Turning now to FIG. 7, a method 700 for managing workloads within a data center is provided, in accordance with an aspect of the present invention. Method 700 may be performed by a control fabric that manages workloads within a data center.

At step 710, substantially all of the first class of servers within a data center unit are set to a low powered mode during a first time period. The data center unit has a nonhomogeneous deployment of servers within the data center unit comprising at least the first class of server and a second class of server. The first period of time corresponds to a low demand period for a workload the first class of server is optimized to process. For example, a low gaming workload may occur during the day and gaming optimized servers may be set to a low power mode.

At step 720 substantially all of the second class of servers within the data center unit are set to a low power mode during a second time period. The first and second time periods do not substantially overlap in one aspect. The nonoverlapping time periods allow the first class of servers and second class of servers to satisfy peak demand for the computing loads they are optimized to handle. As described previously, the data center unit could be a rack, chassis, or some other unit.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. A data center having nonhomogeneous servers interleaved within a rack comprising: a first quantity of graphics optimized servers having a first hardware configuration and a second quantity of general processing optimized servers having a second hardware configuration that is different from the first hardware configuration, the first quantity of graphics optimized servers and the second quantity of general processing optimized servers being power balanced to use a substantially equal amount of power at peak power, and an amount of cooling available being insufficient to cool both the first quantity of graphics optimized servers and the second quantity of general processing optimized servers in active processing mode, wherein the first hardware configuration comprises a graphics processing unit ("GPU") and the second hardware configuration does not include GPU, and wherein interleaved within a rack means that the first quantity of graphics optimized servers and the second quantity of general processing optimized servers are arranged within the rack in an alternating arrangement.

2. The data center of claim 1, wherein the graphics optimized server outputs a rendered video game image over a wide area network to a remotely located gaming device.

3. The data center of claim 1, wherein the graphics optimized server has a central processing unit ("CPU"), and a video encoder, and wherein a maximum power usage of the GPU comprises more than 40% of the graphics optimized server's maximum power usage.

4. The data center of claim 1, wherein the first class of server and the second class of server generate a substantially equal amount of heat when in use, and the amount of available cooling for the data center unit is less than 60% of an amount needed to adequately cool all servers in the first class of server and the second class of server running in the active processing mode.

5. The data center of claim 1, wherein the first quantity and the second quantity are substantially equal.

6. The data center of claim 1, wherein the first quantity of graphics optimized servers is designed for a workload with a peak usage during a first time period that does not overlap with a second time period for which the second quantity of general processing optimized servers is designed.

7. The data center of claim 1, wherein the rack uses vertical cooling provided by one or more fans located on top of the rack or underneath the rack, and wherein the amount of cooling available does not exceed 70% of what is adequate to facilitate simultaneous operation of the first quantity of graphics optimized servers and the second quantity of general processing optimized servers in the active processing mode.

8. A method for managing workloads within a data center, the method comprising:

during a first time period, setting substantially all of a first class of server within a data center rack to a low power mode, the data center rack having a nonhomogeneous deployment of servers comprising at least the first class of server and a second class of server, an amount of available cooling for the data center rack being insufficient to cool all servers in the first class of server and the second class of server running in an active processing mode, wherein the first class of server has a first hardware configuration and the second class of server has a second hardware configuration, wherein the first hardware configuration comprises a graphics processing unit ("GPU") and the second hardware configuration does not include GPU, wherein the nonhomogeneous deployment is in a repeating pattern of a unit of the first class of server adjacent to a unit of the second class of server; and during a second time period in the data center, setting a majority of the second class of server within the data center rack to the low power mode, the second time period not substantially overlapping with the first time period.

9. The method of claim 8, wherein the rack uses vertical cooling provided by one or more fans located on top of the rack or underneath the rack, and wherein the amount of cooling available does not exceed 70% of what is adequate to facilitate simultaneous operation of the first quantity of graphics optimized servers and the second quantity of general processing optimized servers in the active processing mode.

10. The method of claim 8, wherein the rack include the same amount of the first class of server and the second class of server.

11. The method of claim 8, wherein the first class of server is a game optimized server and the second class of server is a general purpose server.

12. The method of claim 8, wherein the first class of server and the second class of server generate a substantially equal amount of heat when in use, and the amount of available cooling for the data center unit is less than 60% of an amount needed to adequately cool all servers in the first class of server and the second class of server running in the active processing mode.

13. The method of claim 8, wherein the first class of servers is designed for a workload with a peak usage during a first time period that does not overlap with a second time period during which the second class of servers is designed.

14. The method of claim 8, wherein the first class of server outputs a rendered video game image over a wide area network to a remotely located graphics device.

15. A data center system comprising:

a data center rack having a total quantity of servers comprising at least graphics optimized servers and general purpose servers, wherein the general purpose servers and the graphics optimized servers are arranged within the rack in an alternating pattern of a graphics optimized server adjacent to a general purpose server; and a data center controller to control an operation of the graphics optimized servers and the general purpose servers within the rack to ensure that at least 40% of the total quantity of servers in the data center rack are in a low power mode and less than 60% of the total quantity of servers are in an active processing mode, an amount of cooling available for the graphics optimized servers and the general purpose servers being insufficient to cool the total quantity of servers in an active processing mode wherein the graphics optimized server outputs a rendered video game image over a wide area network to a remotely located gaming device.

16. The data center system of claim 15, wherein the general purpose servers and the graphics optimized servers output a substantially equal amount of heat when running in the active processing mode.

17. The data center system of claim 15, further comprising a cooling system for the total quantity of servers, the cooling system having a cooling capacity that is not adequate to maintain operational temperatures within the total quantity of servers when more than 70% of the total quantity of servers is in the active processing mode.

18. The data center system of claim 17, wherein the cooling system is a vertical cooling system provided by one or more fans located on top of the rack or underneath the rack.

19. The data center system of claim 15, wherein the graphics optimized servers are designed for a workload with a peak usage during a first time period that does not overlap with a second time period for which the general processing optimized servers are designed.

20. The data center system of claim 15, wherein the graphics optimized servers have a graphics processing unit ("GPU"), a central processing unit ("CPU"), and a video encoder, and wherein a maximum power usage of the GPU comprises more than 40% of the graphics optimized servers' maximum power usage.

* * * * *